US008977898B1

(12) United States Patent
Veeraswamy et al.

(10) Patent No.: US 8,977,898 B1
(45) Date of Patent: Mar. 10, 2015

(54) CONCURRENT ACCESS TO DATA DURING REPLAY OF A TRANSACTION LOG

(71) Applicant: EMC Corporation, Hopkinton, MA (US)

(72) Inventors: Sairam Veeraswamy, South Grafton, MA (US); Peter C. Bixby, Westborough, MA (US)

(73) Assignee: EMC Corporation, Hopkinton, MA (US)

(*) Notice: Subject to any disclaimer, the term of this patent is extended or adjusted under 35 U.S.C. 154(b) by 240 days.

(21) Appl. No.: 13/625,292

(22) Filed: Sep. 24, 2012

(51) Int. Cl.
G06F 11/00 (2006.01)

(52) U.S. Cl.
USPC ............... 714/20; 714/15; 714/16; 714/19

(58) Field of Classification Search
USPC ........................... 714/15, 16, 19, 20
See application file for complete search history.

(56) References Cited

U.S. PATENT DOCUMENTS

| 5,333,303 | A | * | 7/1994 | Mohan | 714/20 |
|---|---|---|---|---|---|
| 5,765,151 | A | | 6/1998 | Senator | |
| 6,535,949 | B1 | | 3/2003 | Parker | |
| 6,895,529 | B2 | * | 5/2005 | Egolf et al. | 714/15 |
| 7,076,509 | B1 | | 7/2006 | Chen et al. | |
| 7,178,145 | B2 | | 2/2007 | Bono | |
| 7,356,657 | B2 | | 4/2008 | Mikami | |
| 7,373,364 | B1 | | 5/2008 | Chapman | |
| 7,529,887 | B1 | | 5/2009 | Haase et al. | |
| 7,631,009 | B1 | | 12/2009 | Patel et al. | |
| 7,631,071 | B2 | * | 12/2009 | Cabrera et al. | 709/224 |
| 7,694,191 | B1 | | 4/2010 | Bono et al. | |
| 7,840,595 | B1 | | 11/2010 | Blitzer et al. | |
| 7,865,485 | B2 | | 1/2011 | Mullick et al. | |
| 7,882,386 | B1 | | 2/2011 | Potnis et al. | |
| 8,037,345 | B1 | | 10/2011 | Iyer et al. | |
| 8,161,236 | B1 | | 4/2012 | Noveck et al. | |
| 8,171,257 | B2 | | 5/2012 | Lewis | |
| 8,180,973 | B1 | | 5/2012 | Armangau et al. | |
| 8,244,903 | B2 | | 8/2012 | Bono | |
| 8,285,967 | B1 | | 10/2012 | Veeraswamy et al. | |
| 8,326,816 | B2 | * | 12/2012 | Colle et al. | 707/705 |
| 2004/0103123 | A1 | | 5/2004 | Bradshaw | |
| 2004/0210796 | A1 | | 10/2004 | Largman et al. | |

OTHER PUBLICATIONS

Uresh Vahalia et al., "Metadata Logging in an NFS Server," USENIX 1995, New Orleans, LA, Jan. 16-20, 1995, 12 pages, The USENIX Association, Berkeley, CA.

(Continued)

Primary Examiner — Joshua P Lottich
(74) Attorney, Agent, or Firm — Deepika Bhayana; Jason A. Reyes; Krishnedu Gupta

(57) ABSTRACT

A dataset is concurrently recovered after a server crash while the dataset is actively used for servicing client requests. In response to a reboot, records of not-yet-completed transactions in a transaction log are parsed to create a graph of dependencies between the transactions. Once this graph has been created, clients may access a specified block of the dataset after on-demand recovery of the specified block. The on-demand recovery is concurrent with a background recovery task that replays the not-yet-completed transactions in time order. The on-demand recovery uses the dependency graph to replay any and all transactions that support recovery of the specified block, so that recovery of the specified block includes update of other blocks to be consistent with the recovered block in accordance with the not-yet-completed transactions.

20 Claims, 10 Drawing Sheets

(56) References Cited

OTHER PUBLICATIONS

Uresh Vahalia, "Unix Internals—The New Frontiers," pp. 187-219, 220-290, 338-371, Prentice-Hall, Inc., Upper Saddle River, NJ (1996).

"System Administration Guide: Devices and File Systems, UFS Logging," 2010, two pages, Sun Microsystems, Inc., Santa Clara, CA.

"Celerra File Server Architecture for High Availability," Aug. 1999, 11 pages, EMC Corporation, Hopkinton, MA.

John Ousterhout et al., "Beating the I/O Bottleneck: A Case for Log-Structured File Systems," Operating Systems Review, vol. 23, No. 1, Jan. 1989, pp. 11-28, Association for Computing Machinery, New York, NY.

Fred Douglis et al., "Log-Structured File Systems," COMPCON 89, San Francisco, CA, Feb. 27-Mar. 3, 1989, pp. 124-129, IEEE, New York, NY.

Gregory Ganger et al., "Soft Updates: A Solution to the Meta-data Update Problem in File Systems," ACM Transactions on Computer Systems, vol. 18, No. 2, pp. 127-153, May 2000, Association for Computing Machinery, New York, NY.

Juan I. Santos Florido, Journal File Systems, Linux Gazette, Jul. 2000, Issue 55, 11 pages, Linux Journal, Seattle, WA.

Mendle Rosenblum et al., "The Design and Implementation of a Log-Structured File System," ACM Transactions on Computer Systems, vol. 10, No. 1, Feb. 1992, pp. 26-52, Association for Computing Machinery, New York, NY.

Adam Moody et al., "Design, modeling, and evaluation of a scalable multi-level checkpointing system," 2010 ACM/IEEE International Conference for High Performance Computing, Networking, Storage and Analysis (SC10), New Orleans, LA, Nov. 13-19, 2010, pp. 1-11, IEEE, New York, NY.

M. Morioka et al., Design and Evaluation of the High Performance Multi-Processor Server, VLSI in Computers and Processors, Cambridge, Mass., Oct. 10-12, 1994, pp. 66-69, IEEE Computer Society Press, Los Alamitos, CA.

Building Cutting-Edge Server Applications, White Paper, 2002, 10 pages, Intel Corporation, Santa Clara, CA.

Intel Pentium 4 and Intel Xeon Processor Optimization, Reference Manual, 2002, 35 pages, Intel Corporation, Santa Clara, CA.

Threading Tools, web page, downloaded Jul. 13, 2002, 6 pages, intel.com, Intel Corporation, Santa Clara, CA.

Ningning Zhu, "Data Versioning Systems," Research Proficiency Exam Report, ECSL Technical reports (TR-131), www.ecsl.cs.sunysb.edu/tech_reports.html, 33 pages, Feb. 2003, Computer Science Department, Stony Brook University, Stony Brook, NY.

* cited by examiner

| Transaction | Sub-transaction | Block Number |
|---|---|---|
| 70 – Block Write | | |
| | Inode Change | 4 |
| 71 - File Create | | |
| | Allocate Inode | 3 |
| | Inode Change to directory | 5 |
| | Directory Change | 195 |
| | Inode Change for file | 4 |
| 74 - Set File Length | | |
| | Inode Change | 4 |
| 75 - Block Write | | |
| | Allocate Block | 3 |
| | Inode Change | 5 |
| 76 - Rename | | |
| | Directory Change | 195 |
| | Directory Change | 195 |
| | Inode Change | 5 |
| | Inode Change | 4 |
| | Free Block | 3 |
| | Free Inode | 3 |
| 82 – Block Write | | |
| | Inode Change | 4 |
| 83 – Block Write | | |
| | Alloc Block | 8195 |
| | Indirect Block Change | 24576 |
| | Inode Change | 4 |
| 84 – Block Write | | |
| | Inode Change | 4 |

FIG. 3

CONCURRENT ACCESS TO DATA DURING REPLAY OF A TRANSACTION LOG

FIELD OF THE INVENTION

The present invention relates to replay of a transaction log to recover a dataset in data storage upon re-boot of a data processor.

BACKGROUND OF THE INVENTION

Many client applications and operating system programs use a transactional model to insure the consistency of a dataset in data storage. Changes to the dataset are captured in transactions. Each transaction is performed in such a way that in the event of a system failure, it is possible to complete all of the changes of the transaction so that the dataset is restored to a consistent state.

For example, a single transaction in an accounting application transfers a certain amount of money from a first account to a second account. This transaction debits the first account by the certain amount and credits the second account by the same amount. If a system failure occurs during the transfer, the dataset of the accounts can be left in an inconsistent state in which the accounts do not balance because the sum of the money in the two accounts has changed by the certain amount. In this case, the transactional model permits a recovery program to restore the dataset to a consistent state upon re-boot of the system after the system failure.

Operating system programs such as file system managers and database managers typically use the transactional model to restore a file system or a database to a consistent state upon reboot of a data processor after a system failure. In the case of a server, transaction logging is the preferred method of using the transaction model. Transaction logging involves writing a record for each transaction to a transaction log in data storage before the writing of the changes of the transaction to the dataset in data storage, so that the transaction log can be used to restore the dataset to a consistent state after a system failure.

For example, a client application sends a transaction request to an operating system program, and the operating system program responds by writing a corresponding transaction record to the transaction log, and then returning an acknowledgement of completion of the transaction to the client application, and then beginning a task of writing the changes of the transaction to the dataset in storage. In this fashion, the use of the transaction log permits the processing of a next transaction to begin before the changes of a previous transaction are written to the dataset in storage. Latency of responding to the transaction request is reduced by writing the transaction record to the transaction log in data storage faster than the corresponding changes can be written to the dataset in data storage.

Upon reboot of the data processor after a system failure, the transaction log may include many records of transactions not-yet-completed by the time of the reboot. In this case, a recovery program replays all of these not-yet-completed transactions so that all of the changes of the not-yet-completed transactions are applied to the dataset. In this fashion, the dataset is restored to the consistent state requested by the last transaction request that was acknowledged as completed. Further details of the logging and replay process are described in Uresh Vahalia et al., Metadata Logging in an NFS Server, USENIX 1995, Jan. 16-20, 1995, New Orleans, La., 12 pages, the USENIX Association, Berkeley, Calif.

SUMMARY OF THE INVENTION

It is desired to reduce the amount of time required to restore client access to a dataset when a data processor is rebooted after a system failure, such as a system crash, power failure, or hardware issue. Currently, all of the records of the not-yet-completed transactions in the transaction log are replayed before client access is restored to the dataset. While the replay is reasonably efficient, the time for the replay is in addition to time needed for other processing to reboot the operating system. The delay in restoring client access can lead to client timeouts and errors.

In accordance with a basic aspect, the invention provides a method of recovery of a dataset in response to reboot of a data processor of a data storage system. The data storage system has data storage storing the dataset and a log of records of transactions upon the dataset. The method includes the data processor executing computer instructions stored on a non-transitory computer readable storage medium to perform the steps of: (a) parsing records in the log of transactions not-yet-completed by the time of the re-boot in order to create a dependency graph of dependencies between the not-yet-completed transactions; and then (b) performing a background task of replay of the not-yet-completed transactions in a time order sequence, and concurrent with the background task of replay of the not-yet-completed transactions in the time order sequence, responding to a request from a client for access to a specified block of data in the dataset by performing on-demand recovery of the specified block and then performing client access to the recovered specified block, and the on-demand recovery of the specified block accessing the dependency graph in order to replay not-yet-completed transactions that support recovery of the specified block.

In accordance with another aspect, the invention provides a data storage system including data storage, a data processor, and a non-transitory computer readable storage medium. The data storage stores a dataset and a log of records of transactions upon the dataset. The data processor is coupled to the data storage for providing a client with access to the dataset. The non-transitory computer readable storage medium is coupled to the data processor and stores computer instructions. The computer instructions, when executed by the data processor, perform recovery of the dataset in response to reboot of the data processor. The recovery includes the steps of: (a) parsing records in the log of transactions not-yet-completed by the time of the re-boot in order to create a dependency graph of dependencies between the not-yet-completed transactions; and then (b) performing a background task of replay of the not-yet-completed transactions in a time order sequence, and concurrent with the background task of replay of the not-yet-completed transactions in the time order sequence, responding to a request from the client for access to a specified block of data in the dataset by performing on-demand recovery of the specified block and then performing client access to the recovered specified block, and the on-demand recovery of the specified block accessing the dependency graph in order to replay not-yet-completed transactions that support recovery of the specified block.

In accordance with a final aspect, the invention provides a data storage system including data storage, a data processor, and a non-transitory computer readable storage medium. The data storage stores a dataset and a log of records of transactions upon the dataset. The data processor is coupled to the data storage for providing a client with access to the dataset.

The non-transitory computer readable storage medium is coupled to the data processor and stores computer instructions. The computer instructions include a dataset manager for managing client access to the dataset, and a dataset recovery program. The dataset manager includes an on-demand recovery routine. The dataset recovery program, when executed by the data processor, performs recovery of the dataset in response to reboot of the data processor, by performing the step of: (a) parsing records in the log of transactions not-yet-completed by the time of the re-boot in order to create a dependency graph of dependencies between the not-yet-completed transactions; and then (b) initiating a background task of replay of the not-yet-completed transactions in a time order sequence, and enabling the on-demand recovery routine. The dataset manager, when executed by the data processor, responds to a request from the client for access to a specified block of data in the dataset by performing on-demand recovery of the specified block when the on-demand recovery routine is enabled, and then performing client access to the recovered specified block. The on-demand recovery of the specified block accesses the dependency graph in order to replay not-yet-completed transactions that support recovery of the specified block.

BRIEF DESCRIPTION OF THE DRAWINGS

Additional features and advantages of the invention will be described below with reference to the drawings, in which:

FIG. 3 shows a specific example of transactions and sub-transactions in records of a transaction log for the case of transactions upon a file in a file system;

Figure 1:
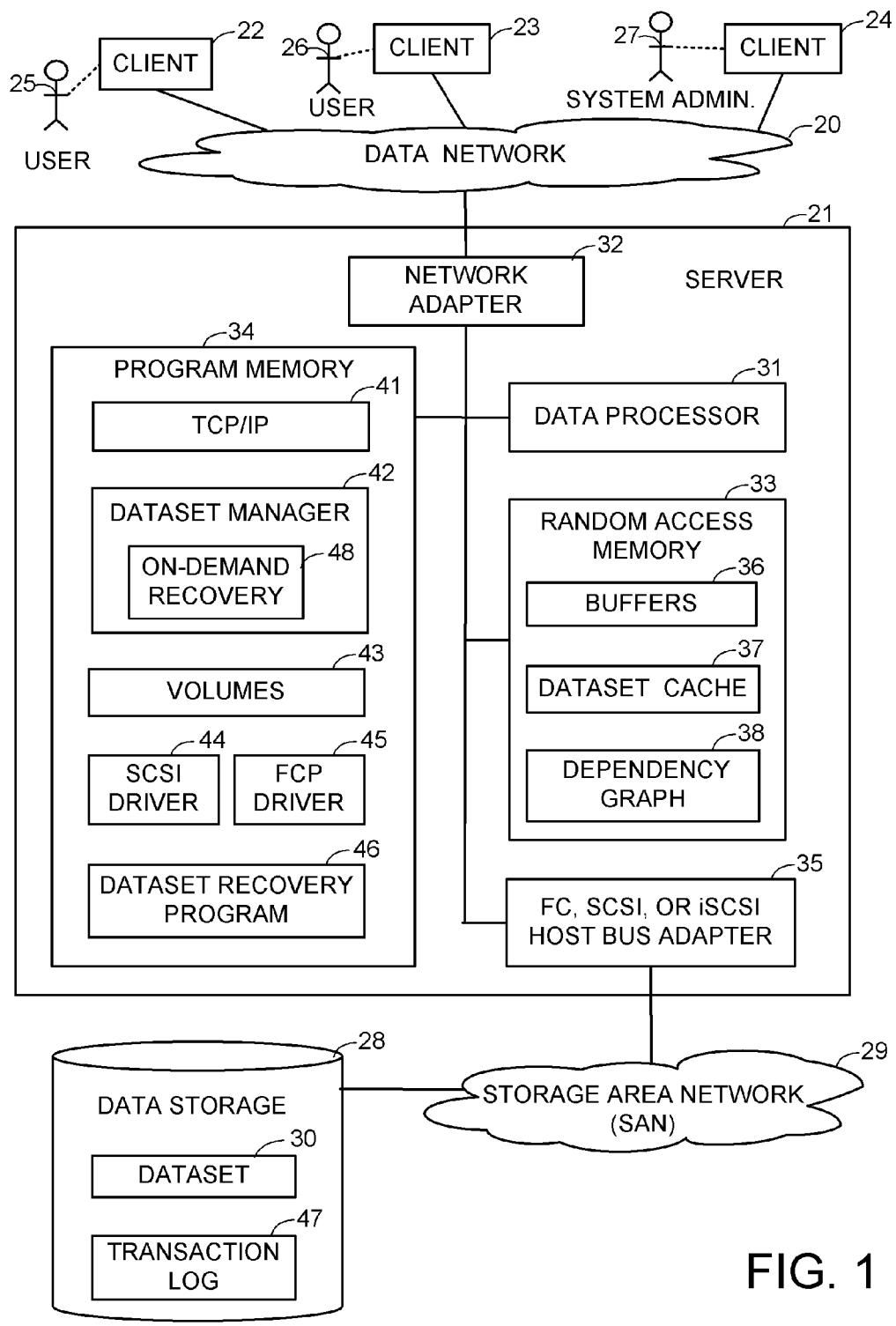
FIG. 1 is a block diagram of a data network including a data storage system incorporating the present invention.

While the invention is susceptible to various modifications and alternative forms, a specific embodiment thereof has been shown in the drawings and will be described in detail. It should be understood, however, that it is not intended to limit the invention to the particular form shown, but on the contrary, the intention is to cover all modifications, equivalents, and alternatives falling within the scope of the invention as defined by the appended claims.

DETAILED DESCRIPTION OF THE PREFERRED EMBODIMENT

With reference to FIG. 1, there is shown a data network 20 including a server 21 for servicing requests from network clients 22, 23, 24 for access to a dataset 30 in data storage 28. The network clients 22, 23, 24, for example, are workstations operated by respective human users 25, 26, 27. A storage area network (SAN) 29 links the data storage 28 to the server 21 to form a data storage system. The data storage 28, for example, is an array of disk drives.

The server 21 includes a data processor 31, a network adapter 32 linking the data processor to the data network 20, random access memory 33, program memory 34, and a Fibre-Channel (FC), Small Computer Systems Interface (SCSI), or Internet Protocol SCSI (iSCSI) host bus adapter 35 linking the data processor to the storage area network (SAN) 29. The data processor 31 is a general purpose digital computer data processor including one or more core central processing units (CPUs) for executing computer program instructions stored in the program memory 34. The program memory 34 is a non-transitory computer readable storage medium, such as electrically erasable and programmable read-only memory (EEPROM). The random access memory 33 includes buffers 36 and a dataset cache 37.

The program memory 34 includes a program layer 41 for network communication using the Transmission Control Protocol (TCP) and the Internet Protocol (IP). The program memory 34 also includes a dataset manager 42 for responding to client requests for access to the dataset 30, and a logical volumes layer 43 providing a logical volume upon which the dataset 30 is built. The logical volume is configured from the data storage 28. For example, the logical volume is configured from one or more logical unit numbers (LUNs) of the data storage 28, and the logical volumes layer 43 translates logical block numbers from the dataset manager 42 to the LUNs where the desired blocks of storage are found.

The logical volumes layer 43 is layered over a SCSI driver 44 and a Fibre-Channel protocol (FCP) driver 45 in order to access the logical unit numbers (LUNs) in the storage area network (SAN) 29. The data processor 31 sends storage access requests through the host bus adapter 35 using the SCSI protocol, the iSCSI protocol, or the Fibre-Channel protocol, depending on the particular protocol used by the storage area network (SAN) 29.

The dataset manager 42 uses a transaction log 47 to provide a way of restoring the dataset 30 to an up-to-date, correct, and consistent state after a system failure. When the dataset manager 42 receives a client request to perform a transaction upon the dataset 30, the dataset manager responds by writing a corresponding transaction record to the transaction log, and then returning an acknowledgement of completion of the transaction to the client, and then beginning a task of writing the changes of the transaction to the dataset in storage.

The writing of the transaction records to the transaction log is significantly faster and more efficient than making changes to what could be many different and spatially dispersed data structures in the dataset 30 in the data storage 28. This advantage is due to a couple of factors: 1) writing in an append only fashion to the transaction log 47 is more efficient; 2) multiple changes may be included in a single log transaction, and 3) the atomicity of the transaction relieves the system from any need to order updates. In addition, write gathering techniques are used that allow a single write to the log to contain multiple transactions.

The server 21 also has a dataset cache 37 so that the task of writing the changes of the transaction to the dataset 30 in storage 28 can be done more efficiently in a delayed fashion while the dataset manager 42 services subsequent client requests by accessing the dataset cache. Therefore the dataset cache 37 works in combination with the transaction logging to reduce the latency in responding to the client requests while protecting the consistency of the dataset 30. The latency can be further reduced by storing the transaction log 47 in fast data storage such as solid-state disk or flash memory.

A cost of reducing the latency is that records of many not-yet-completed transactions become stored in the transaction log, which increases the time for recovery after a system failure. Upon reboot of the data processor 31 after a system failure, the dataset 30 could be restored to an up-to-date, correct, and consistent state by the conventional method of a sequential replay of all of the not-yet-completed transactions in the transaction log 47. In this conventional method of sequential replay, the clients are denied access to the dataset until the replay is finished, so that the clients will not access inconsistent data, and the replay will not write over and therefore obliterate any new changes from the clients.

The present invention concerns a way of recovering the dataset 30 upon reboot of the data processor 31 in which log replay is done after client access is restored to the dataset. Before client access is restored, a dataset recovery program 46 scans the records of the not-yet-completed transactions in the transaction log 47 to create a dependency graph 38 of dependencies between the not-yet-completed transactions. This allows the clients 22, 23, 24 to immediately access the dataset 30 once the dependency graph has been created. This still achieves the goal of restoring the dataset to a correct and consistent state.

So that the clients do not access inconsistent data when the dataset manager 42 receives a client request before the entire dataset is restored, the dataset manager has an on-demand recovery routine 48 for recovering each and every data block needed for servicing the client request. The on-demand recovery routine 48 searches the dependency graph 38 to determine which of the not-yet-completed transactions, if any, should be replayed before accessing a data block needed for servicing the client request.

So that the log replay will not write over any new change of the access for the client request, the dependency graph 38 also keeps track of the recovery state of each not-yet-completed transaction. Upon reaching any transaction record having a recovery state of "recovery in progress," a background task of sequential replay waits until the recovery state changes to "recovery completed" and then skips to the next transaction record in the log. Upon reaching any transaction record having a state of "recovery completed," the background task of sequential replay skips to the next transaction record in the log. In this fashion a transaction replayed by the on-demand recovery routine 48 is not replayed again after the access for the client request.

Figure 2:
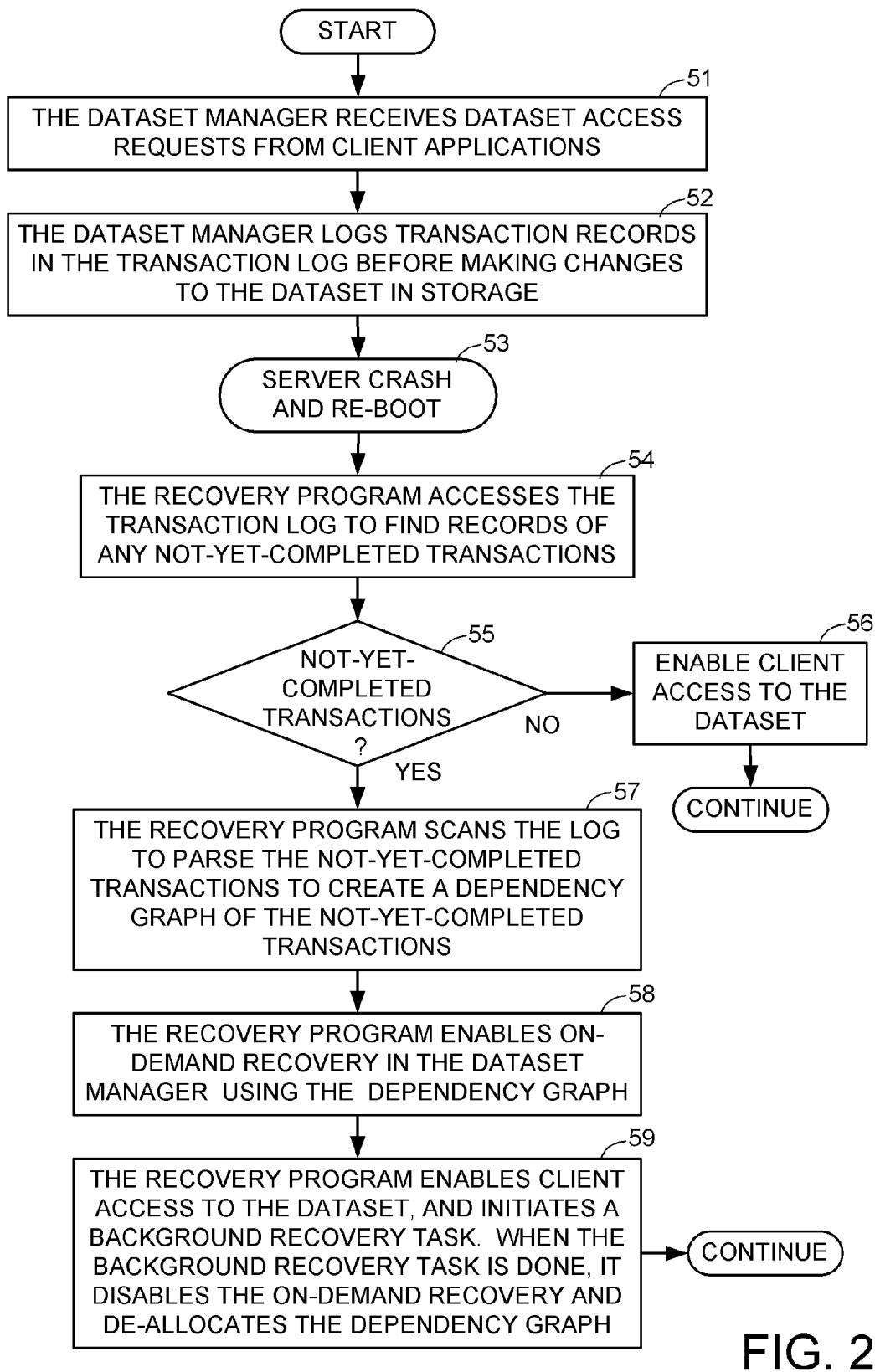
FIG. 2 is a flowchart of a method of recovery of the dataset in FIG. 1 in response to reboot of the data processor in FIG. 1.

FIG. 2 shows the overall process of transaction logging and recovery after a server crash and re-boot. In a first step 51, the dataset manager receives dataset access requests from client applications. In step 52, the dataset manager logs transaction records in the transaction log before making changes to the dataset in storage. In step 53, the normal transaction logging process is interrupted by a server crash and re-boot. In step 54, the recovery program is one of a number of programs that the operating system invokes after re-boot and before enabling client access to the dataset. The recovery program first accesses the transaction log to find records of any not-yet-completed transactions.

In a conventional implementation, the transaction log is a circular log. In other words, a certain amount of contiguous storage is allocated to the log, and when the process of appending new transaction records reaches the end of this allocated storage, the process is repeated at the beginning of the allocated storage. Each transaction record has a sequence number or timestamp that is unique among all of the records in the log. Therefore a binary search of the sequence numbers or timestamps will locate the record most recently written to the log. This record most recently written to the log is known as the tail of the log.

The process of appending new transaction records to the log includes the dataset manager 42 receiving, from the data storage 28, confirmation that one or more transaction records have actually been written to the data storage. The dataset manager 42 keeps a record of the last transaction record confirmed as actually having been written to the transaction log in the data storage. The first record following this record of the last completed transaction is known as the head of the log. Just before writing each new transaction record to the log, the dataset manager inserts the transaction record number of the last completed transaction into the new transaction record.

In a conventional implementation, the log is also used to record a special transaction of closing the log. During proper shutdown of the server 21, the dataset manager 42 waits until confirmation has been received of all of transaction records written to the log. Then the dataset manager 42 writes a record of the special transaction of closing the log. In this case, in step 54, the records of the not-yet-completed transactions are found by finding the tail of the log, and then reading the record at the tail of the log to discover whether the log was properly closed and to discover the record of the last completed transaction. If the record at the tail of the log indicates the special transaction of closing the log, and the head of the log is the record at the tail of the log, then there are no uncompleted transactions and the dataset manager was properly shut down. In this case, execution branches from step 55 to step 56 to enable client access to the dataset, and execution continues from step 56 to process client requests for access to the dataset in the usual fashion. Otherwise, in the usual case of a server crash, there are records of not-yet-completed transactions following the record of the last completed transaction up to and including the tail of the log, so that execution continues from step 55 to step 57.

In step 57, the recovery program scans the log to parse the records of the not-yet-completed transactions to create a dependency graph of the not-yet-completed transactions. Next, in step 58, the recovery program enables on-demand recovery (48 in FIG. 1) in the dataset manager (42 in FIG. 1), and this on-demand recovery uses the dependency graph. Then, in step 59, the recovery program enables client access to the dataset, and initiates a background recovery task. When the background recovery task is done, it disables the on-demand recovery and de-allocates the dependency graph.

After step 59, execution continues to process client requests for access to the dataset in the usual fashion, except that when the dataset manager processes each client request for access to a specified block the dataset, this processing includes execution of an additional on-demand recovery routine (48 in FIG. 1) that recovers the specified block before the requested client access is performed upon the specified block. The on-demand recovery routine is executed for the processing of each client request for access to the dataset until the recovery of the background recovery task is done and the background recovery task disables the on-demand recovery routine.

FIG. 3 shows a specific example of transactions and sub-transactions in records of the transaction log 47 for the case of transactions upon a file in a file system. In this case, the dataset 30 is a UNIX-based file system, and the dataset manager 42 manages the UNIX-based file system is described in Uresh Vahalia, Unix Internals—The New Frontiers, Chapter 9, File System Implementations, pp. 261-290, Prentice-Hall, Inc., Upper Saddle River, N.J. (1996). Each transaction corresponds to a single file system access request received from a client or server application, such as a request for a block write to a specified file, a request to create a new file in a specified directory, a request to set the length of a specified file, and a request to rename a file. Each transaction includes a group of sub-transactions, and each sub-transaction writes data to a specified file system block. The transaction log includes, for each transaction record, the file system block number of each sub-transaction and the data written to this file system block for each sub-transaction. Replay of the transaction log record entails executing the write operations of the sub-transaction data to the sub-transaction blocks.

In general, any transaction requested by a client or server application can be logged as a series of sub-transactions in which each sub-transaction consists of a block number and information about what must be updated in that block. Then the recovery process can be performed by applying the updates in order from the oldest update to the newest update. The order is important because newer transactions may overwrite or invalidate older transactions.

For example, the dataset manager performs each requested transaction by reading any data for the transaction from the dataset 30 in the data storage and storing this data in the dataset cache, and then computing updates from this data, and writing the updates to the transaction log and to the dataset cache 37, and then scheduling the write-back of the updates from the cache 37 to the dataset 30 in the data storage.

A more specific example is the case introduced above of a financial application that transfers a certain amount of money "$X" from a first account to a second account. Suppose that the current balance "$ACCT1" of the first account is stored in "BLOCK_Y" of the dataset and the current balance "$ACCT2" of the second account is stored in "BLOCK_Z" of the dataset. The financial application requests a transaction of debiting the first account in "BLOCK_Y" by "$X" and crediting the second account in "BLOCK_Z" by "$X". The dataset manager performs this transaction by reading "$ACCT1" from "BLOCK_Y", reading "$ACCT2" from "BLOCK_Z", computing a new balance "$ACCT1−$X" for the first account, computing a new balance "$ACCT2+$Y" for the second account, writing a record for the transaction to the log, and then scheduling the write-back of the new data to the dataset in the data storage. The log record for the transaction includes a first sub-transaction "$ACCT1−$X→BLOCK_Y" and a second sub-transaction "$ACCT2+$X→BLOCK_Z". Each sub-transaction therefore writes a specified constant update to a specified block of the dataset.

Sub-transactions in the form of writing a specified constant update to a specified block have the advantage that they are idempotent, meaning that they can be repeated any number of times without changing their result. Because the transactions are time ordered in the log and they are replayed only in the forward direction during recovery, the log recovery may be repeated any number of times if a system crash would occur during the recovery process. Such partial recoveries are totally transparent, as long as a full recovery is eventually completed. Such partial recoveries are likely if records of a large number of not-yet-completed transactions become stored in the log. The logging of idempotent sub-transactions eliminates the need for logging the replay of each transaction during log recovery, while newly executed transactions are logged in the regular fashion during the on-demand recover process.

A successful completion of the recovery process insures a consistent dataset state (barring hardware issues or software bugs). At that point the log may be discarded (i.e. cleaned and reused) and the dataset can be marked as fully recovered. If recovery cannot be completed by replaying the log, then the dataset must be "fixed up" by other means. For example, it may be possible for a file system to be "fixed up" by the UNIX "fsck" utility. Fortunately, a failure of the log recovery process is an extremely rare occurrence.

The on-demand recovery process uses a dependency graph so that when a client or application requests access to a specified block of the dataset, the dependency graph is accessed to find any not-yet-completed transactions that should be completed before the specified block is accessed for the client or application request. For example, when a client or application requests access to a specified block of the dataset, any not-yet-completed transaction that modifies the specified block should be replayed before the specified block is accessed for the client or application request, and if there are more than one such not-yet-completed transaction, then these not-yet-completed transactions should be replayed in order, from youngest to oldest, before the specified block is accessed for the client or application request. However, any non-yet-completed transaction should not be replayed before any younger not-yet-completed transaction unless the older not-yet-completed transaction has no dependencies upon the younger not-yet completed transaction. Therefore, the dependency graph is used to identify any and all dependencies among the not-yet-completed transactions.

Figure 4:
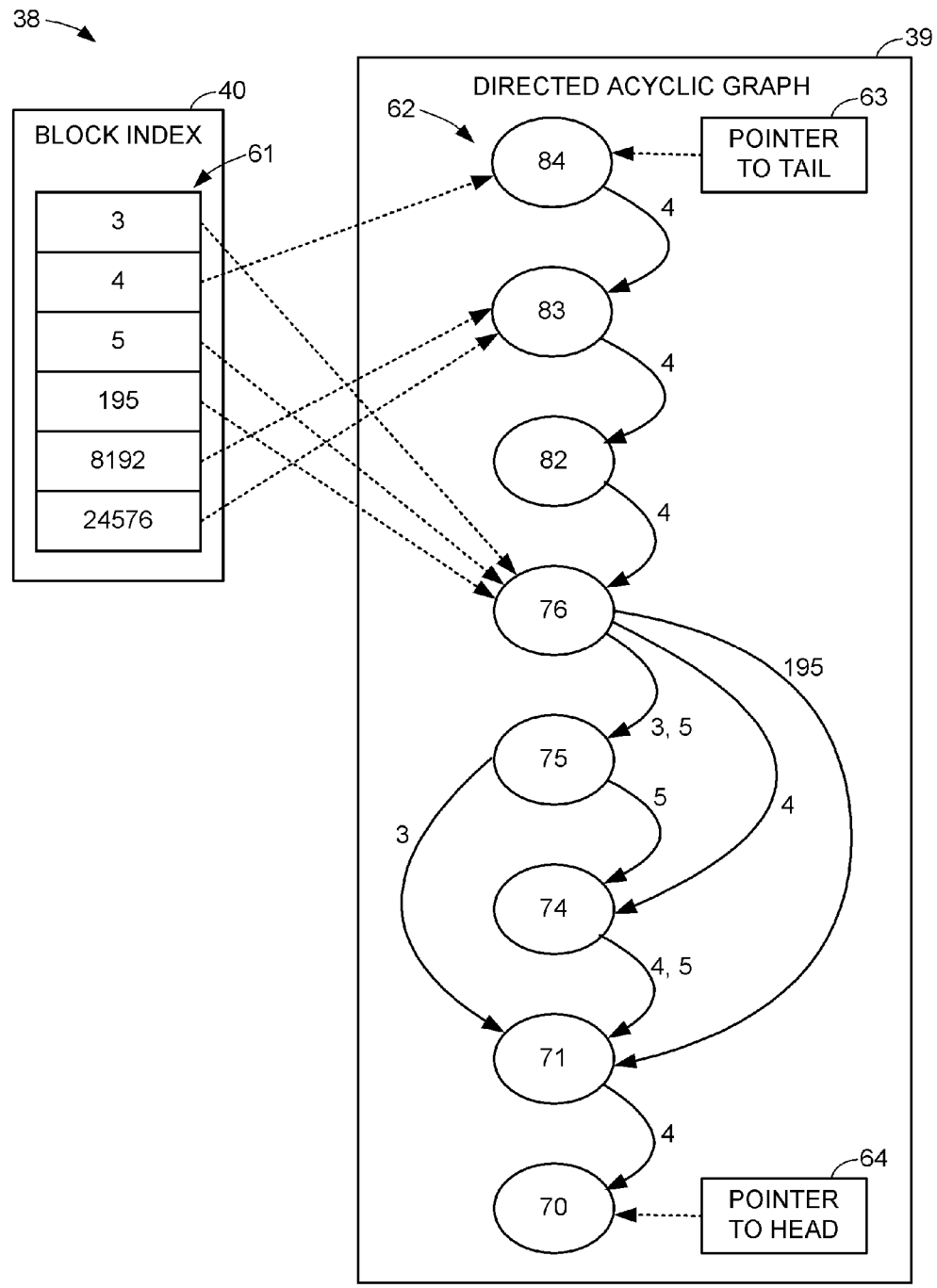
FIG. 4 is a block diagram of a dependency graph corresponding to the records of the transaction log of FIG. 3.

FIG. 4 shows a preferred format of a dependency graph 38 for the not-yet-completed transactions in the transaction log of FIG. 3. The dependency graph 38 includes a directed acyclic graph 39 having a time-ordered series of nodes 62 for the not-yet-completed transactions in the transaction log, so that each not-yet-completed transactions in the transaction log has a respective unique node (shown as an oval) in the directed acyclic graph 39. Therefore there is a one-to-one correspondence between each of the nodes and a corresponding one of the not-yet-completed transactions.

Each node in the directed acyclic graph 39 of FIG. 4 is labeled with a transaction record number indicating an offset or logical address where the transaction record begins in the transaction log. The directed acyclic graph 39 has a pointer 64 to the node corresponding to the transaction record at the head of the log, and a pointer 63 to the tail of the directed acyclic graph 39. When the construction of the directed acyclic graph has been completed, the pointer 63 points to the node corresponding to the transaction record at the tail of the log.

The time-ordering of the series of nodes 62 is done by allocating each node and linking each node into a list of nodes as the log record of each not-yet-completed transaction is scanned during the scanning process (of step 57 in FIG. 2). Thus, in addition to the edges shown in FIG. 4 for the dependencies between the nodes, there is a mechanism that orders the nodes for efficient scanning of the nodes in their time-ordered sequence from the head node (indicated by the pointer to head 64) to the tail node (indicated by the pointer to tail 63). This mechanism is used by the background recovery task (invoked in step 69 of FIG. 2) for replaying not-yet-completed transactions in their time-ordered sequence.

The dependencies between the nodes are indicated by edges, so that each edge points from the node of a dependent transaction to the node of another transaction from which it depends. In FIG. 4, each edge is labeled with a list of block numbers of blocks that give rise to the dependency between the dependent node from which the edge originates to the supporting node to which the arrow of the edge is pointing. For the case in which each transaction has sub-transactions, and each sub-transaction updates a specified block, then for any specified block, the node of the transaction has at least one edge labeled in FIG. 4 with the number of the specified block so long as there is at least one node of an earlier transaction that specified the same block. In a preferred implementation, if there is more than one such node of an earlier transaction that specified the same block, then there is only one edge labeled with the number of the specified block, and this edge points to the most recent node of an earlier transaction that specified the same block. More than one such edge is not needed because nodes of any earlier transactions that specified the same block will be found during a depth-first search of the directed acyclic graph.

For efficient operation of the on-demand recovery routine (48 in FIG. 1), the dependency graph 38 has an associated block index 40 for finding node of the most recent not-yet-completed transaction that modifies a specified block. The block index 40 includes entries 61 storing block numbers of the blocks modified by the not-yet-completed transactions, and for each such block, the entry includes a pointer to the node of the most recent not-yet-completed transaction that modifies the specified block.

Figure 5:
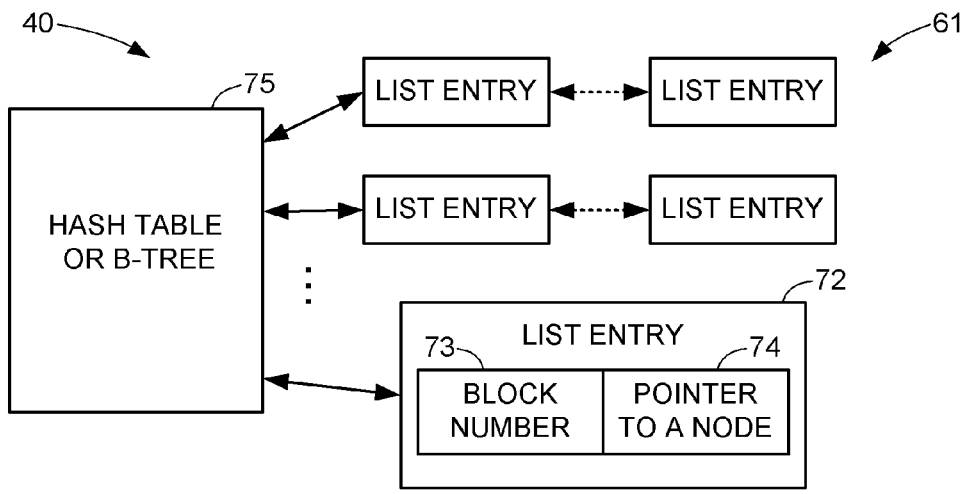
FIG. 5 is a block diagram showing further details of a block index introduced in FIG. 4.

FIG. 5 shows further details of the block index 40. The entries of the block index are entries of one or more doubly-linked lists 61. Each list entry 72 includes a block number field 72 and a field 74 for an associated pointer to a node. The lists 61 are linked together by a hash table or B-tree 75. For example, if the dataset manager uses a hash table index for indexing the dataset to find a specified block in the dataset, then the block index 40 may use a hash table and a similar indexing routine for finding a node associated with a specified block. If the dataset manager uses a B-tree for indexing the dataset to find a specified block, then the block index 40 may use a B-tree and a similar indexing routine for finding a node associated with a specified block.

Figure 6:
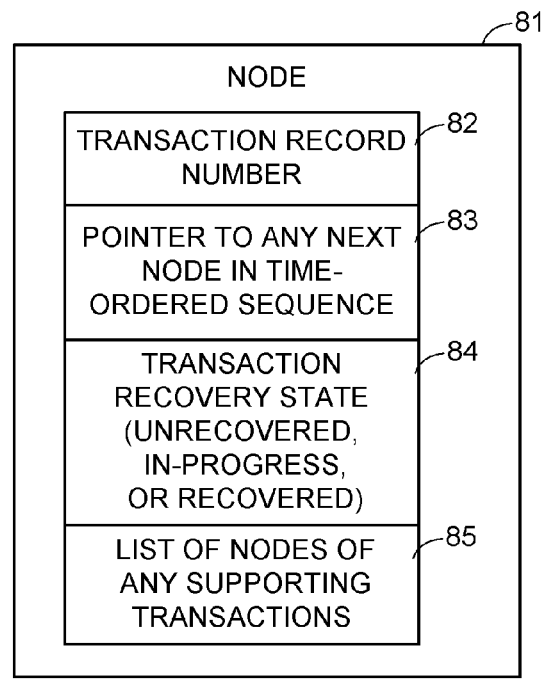
FIG. 6 is a block diagram of one of the nodes in a directed acyclic graph introduced in FIG. 4.

FIG. 6 shows further details of a node 81 in the directed acyclic graph (39 in FIG. 4). The node 81 includes a field 82 for the transaction record number corresponding to the node, a field 83 for a pointer to any next node in the time-ordered sequence of the transactions of the nodes, a field 84 for a transaction recovery state, and a field 85 for a list of nodes of any supporting transactions.

In order to allow the on-demand recovery routine and the background recovery task to be executed concurrently, each transaction in the dependency graph has a recovery state variable. The state may be: "unrecovered," "in-progress," or "recovered." A "recovered" state indicates that recovery of the transaction and all of its associated supporting transactions has been completed. An "in-progress" state indicates that another task has already begun the recovery so that the present task should wait for that recovery to complete. Finally, an "unrecovered" state indicates that this transaction, and any and all not-yet-recovered transactions upon which it depends, need to be recovered.

Performing the task of on-demand recovery and client access concurrent with the background task of replay means that the two tasks are performed over the same interval of time. Therefore the two concurrent tasks can be performed in parallel, or nearly simultaneously by time-interleaved operations. For example, the two tasks could be performed in parallel by a data processor having multiple CPU cores, in which one CPU core could execute the background task of replay while another CPU core could execute the on-demand recovery and then the client access to the dataset. The two tasks could be performed nearly simultaneously by time interleaved operations by a data processor having a single CPU core, in which a task scheduler interrupts the background task of replay temporarily to perform the on-demand recovery on a priority basis, and then the task scheduler resumes the background task of replay once the on-demand recovery and the client access to the dataset has been completed.

Client or server applications may take a variety of locks upon the dataset to control access and maintain dataset consistency. Because the dataset manager performs the on-demand recovery process as part of the block read from disk, there is no need to modify the lock management to accommodate the on-demand recovery process. The on-demand recovery process is completed for the read operation before the read data is returned to the client or server application, so that the client or server application sees only the recovered version of the block.

Figure 7:
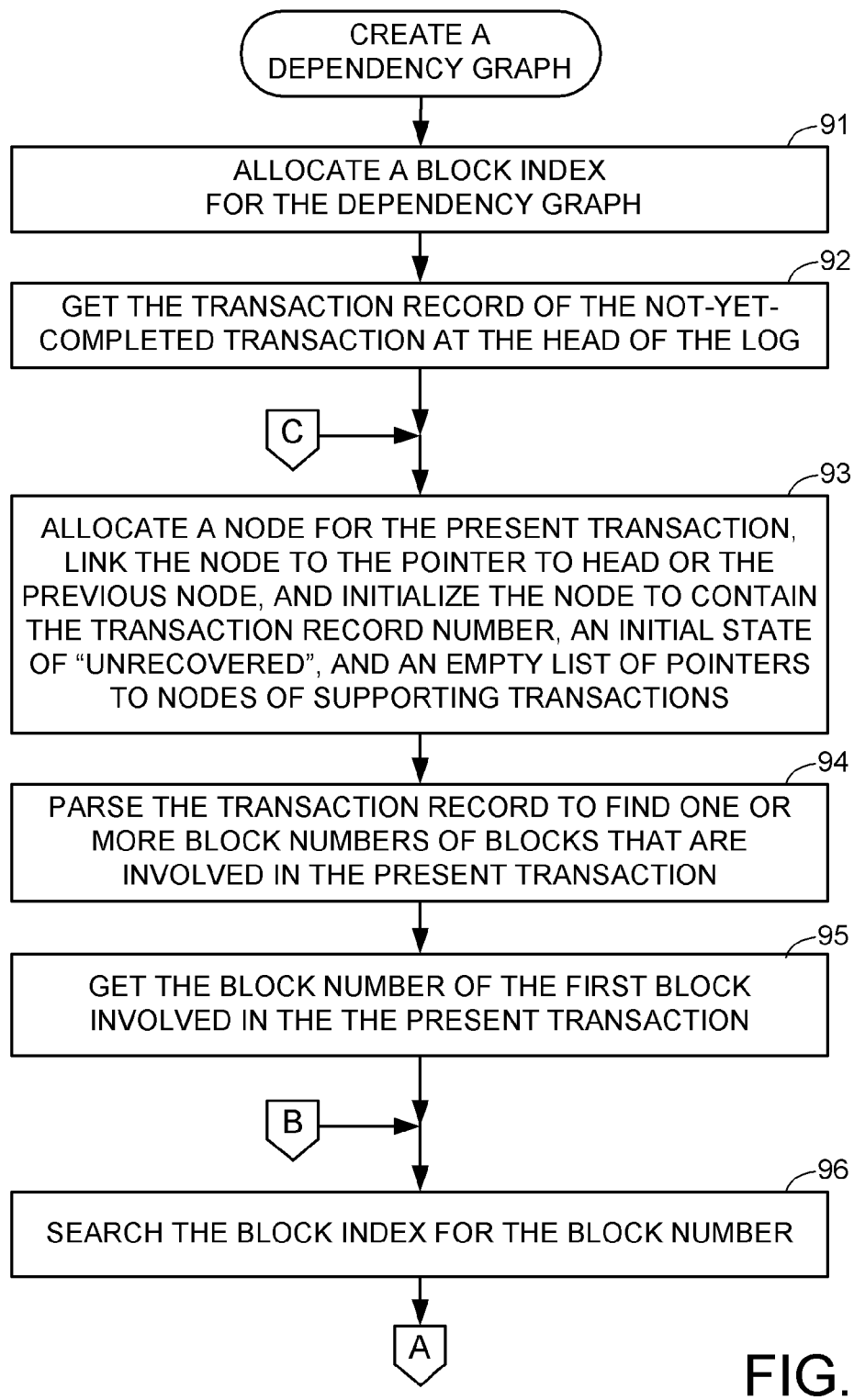
FIGS. 7 and 8 together comprise a flowchart of a subroutine in the dataset recovery program in FIG. 1 for creating the dependency graph by scanning the transaction log to parse records of not-yet-completed transactions.
Figure 8:
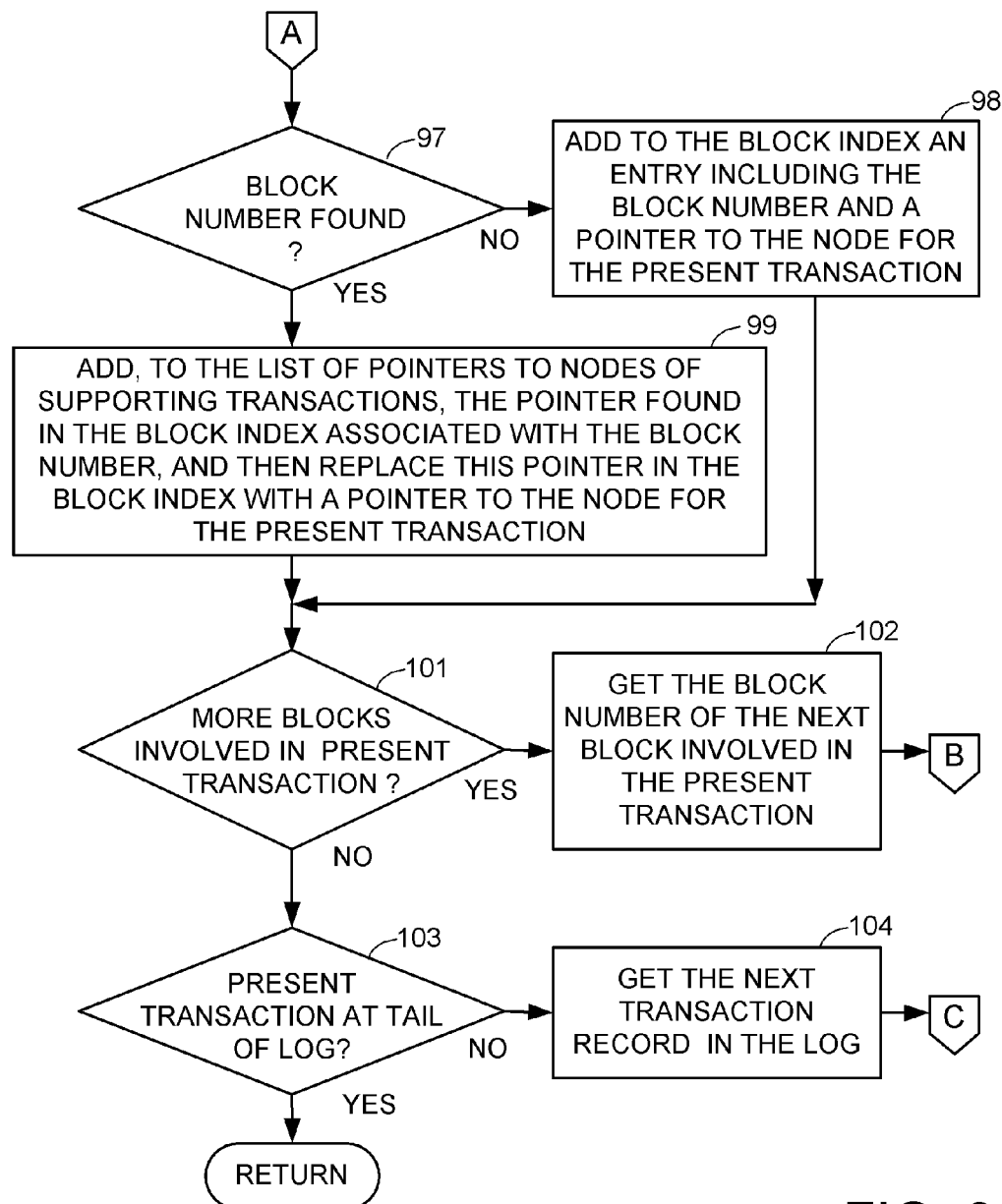

FIGS. 7 and 8 together show a subroutine for creating the dependency graph. In general, the not-yet-completed transactions and sub-transactions in the log are parsed so that each transaction is represented by a node in the graph, and edges in the graph represent dependencies upon earlier transactions. Parsing begins with the oldest not-yet-completed transaction in the log. When a unique block is encountered in a parsed transaction, an entry for the block is created in the block index, and this entry is set with a pointer to the node for the parsed transaction. If the block number already exists in the block index, then an edge is created pointing to the older transaction associated with this block number. In this way the dependency graph and the block index will be complete when the parsing is finished with the newest transaction in the log.

In a first step 91 in FIG. 7, a block index is allocated for the dependency graph. Next, in step 92, the transaction record of the first not-yet-completed transaction is accessed at the head of the log. Then, in step 93, a node for the present transaction is allocated, and this node is linked to the pointer to head (64 in FIG. 4) or to the previous node, and this node is initialized to contain the transaction record number, an initial state of "unrecovered," and an empty list of pointers to nodes of supporting transactions. For example, when the very first node is allocated, the pointer to tail (63 in FIG. 4) and the pointer to head (63 in FIG. 4) are each set to point to this first node. When a subsequent node is allocated, the pointer to tail (64 in FIG. 4) is accessed to find the previous node, and the pointer to the next node in this previous node is set to point to the subsequent node, and the pointer to tail is also set to point to this subsequent node.

In step 94, the transaction record is parsed to find one or more block numbers of blocks that are involved in the present transaction. In step 95, the block number of the first block involved in the transaction is obtained, and then in step 96 the block index is searched for this block number. Execution continues from step 96 to step 97 in FIG. 8.

In step 97 in FIG. 8, if the block number is not found in the block index, then execution branches from step 97 to step 98. In step 98, an entry including the block number and a pointer to the node for the present transaction is added to the block index.

In step 97 in FIG. 8, if the block number is found in the block index, then execution continues from step 97 to step 99. In step 99, the pointer to the node found in the block index associated with the block number, is added to the list (in the node of the present transaction) of pointers to nodes of supporting transactions, and then the pointer in the block index associated with the block number is replaced with a pointer to the node of the present transaction. After steps 98 or 99, execution continues to step 101.

In step 101, if more blocks are involved in the present transaction, then execution branches to step 102. In step 102, the block number of the next block involved in the present transaction is obtained, and execution loops back to step 96 in FIG. 8.

In step 101, if there are not any more blocks involved in the present transaction, then execution continues to step 103. In step 103, if the present transaction is at the tail of the log, then construction of the dependency graph is finished, and execution returns. Otherwise, execution branches from step 103 to step 104. In step 104, the next transaction record is obtained from the log, and execution loops back to step 93 in FIG. 7.

Figure 9:
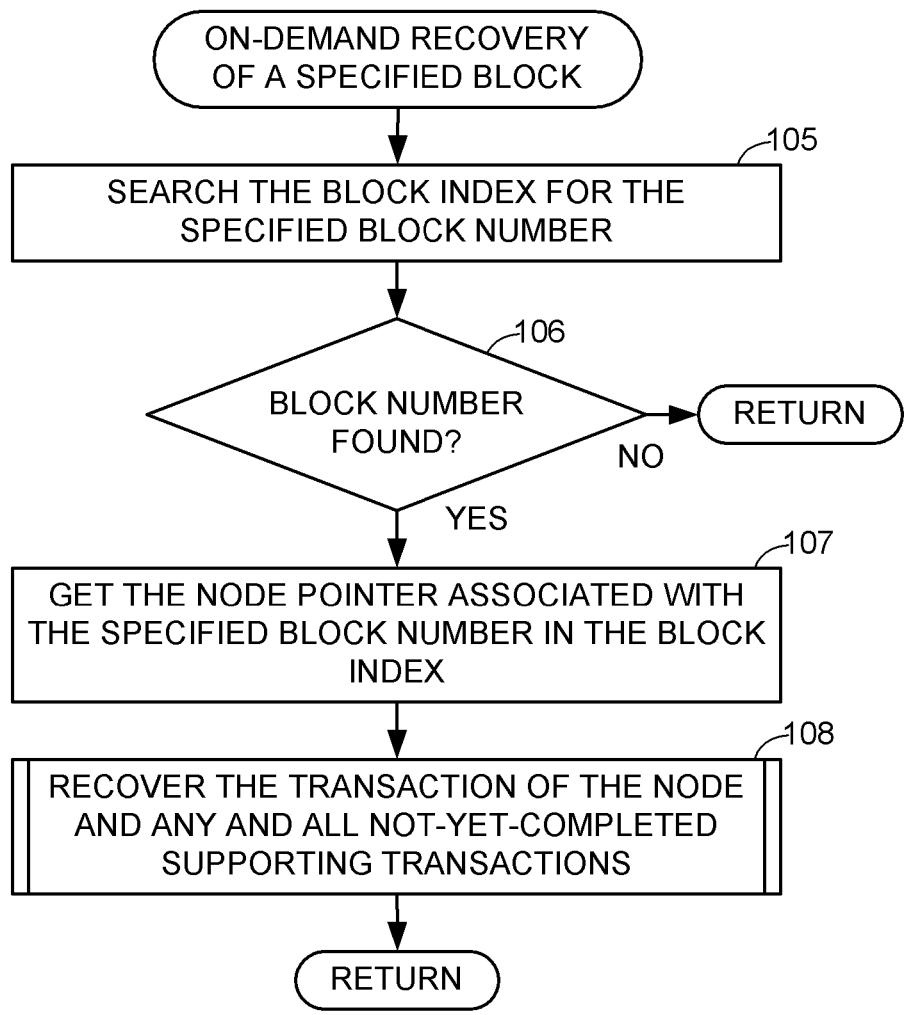
FIG. 9 is a flowchart of an on-demand recovery routine in the dataset manager in FIG. 1 for using the dependency graph to recover a specified block of storage in response to a client request for access to the specified block of storage.

FIG. 9 shows a subroutine for on-demand recovery of a specified block. In general, this subroutine checks whether or not the specified block is in the block index. If the specified block is in the block index, then a block recovery is needed before the block is accessed for a client or server application. The block recovery includes recovery of not only the transaction of the node associated with the specified block in the block index, but also recovery of any and all earlier not-yet-completed transactions that support the transaction of the node associated with the specified node. Also the recovery of each earlier not-yet-completed supporting transaction includes the recovery of any and all earlier not-yet-completed transactions that support the each earlier not-yet-completed supporting transaction. This may include earlier supporting transactions that do not access or modify the specified block, so that other blocks modified by the earlier supporting transactions are updated to be consistent with the recovery of the specified block. Any and all of these supporting not-yet-completed transactions are replayed, and this replay is done in time order from the earliest to latest when there are dependencies. This required time ordering of replay of the not-yet-completed dependent supporting transactions (and any and all of their dependent not-yet-completed supporting transactions) is done efficiently during a depth-first search of the graph by a recursive subroutine call.

For example, consider the case of the financial system in which the client desires to read the balance of the second account, which is stored in "BLOCK_Z". The on-demand recovery routine is called to recover the specified "BLOCK_Z". Suppose that the most recent not-yet completed transaction that involves "BLOCK_Z" is the transaction that includes the first sub-transaction "SACCT1−$X→BLOCK_Y" and the second sub-transaction "SACCT2+SX→BLOCK_Z". In this case the on-demand recovery of the specified block "BLOCK_Z" includes update of "BLOCK_Y" to be consistent with the recovered "BLOCK_Z" in accordance with this transaction. In other words, when the client is given the recovered "BLOCK_Z", the state of "BLOCK_Y" is also recovered to the state existing just after the transfer of "$X". Also, this recovery of "BLOCK_Y" will include the replay of any earlier not-yet-completed transactions that involve "BLOCK_Y". In general, the dataset is always recovered to a state consistent with the not-yet-completed transactions, although this consistent recovery state might not be any state of the dataset that would have been reached absent the processor re-boot and recovery. The consistent recovery state will not definitely reach a state that would have been reached absent the re-boot and recovery until completion of the background recovery task.

In a first step 105 of FIG. 9, the block index is searched for the specified block number. In step 106, if the block number is not found in the block index, then execution returns. Otherwise, if the block number is found in the block index, then execution continues to step 107. In step 107, the node pointer associated with the specified block number is read from the block index. In step 108, a recursive subroutine (shown in FIG. 10) is called to recover the transaction of the pointed-to node and to recover any and all not-yet-completed supporting transactions. After step 108, execution returns.

In general, the depth-first search of the dependency graph is performed by calling a recursive subroutine that searches nodes of the dependency graph that are linked to a specified node by edges of the dependency graph that point from the specified node. The recursive subroutine does this search by calling itself for each of the nodes pointed to by edges that point from the specified node, and then replaying the not-yet-completed transaction corresponding to the specified node.

Figure 10:
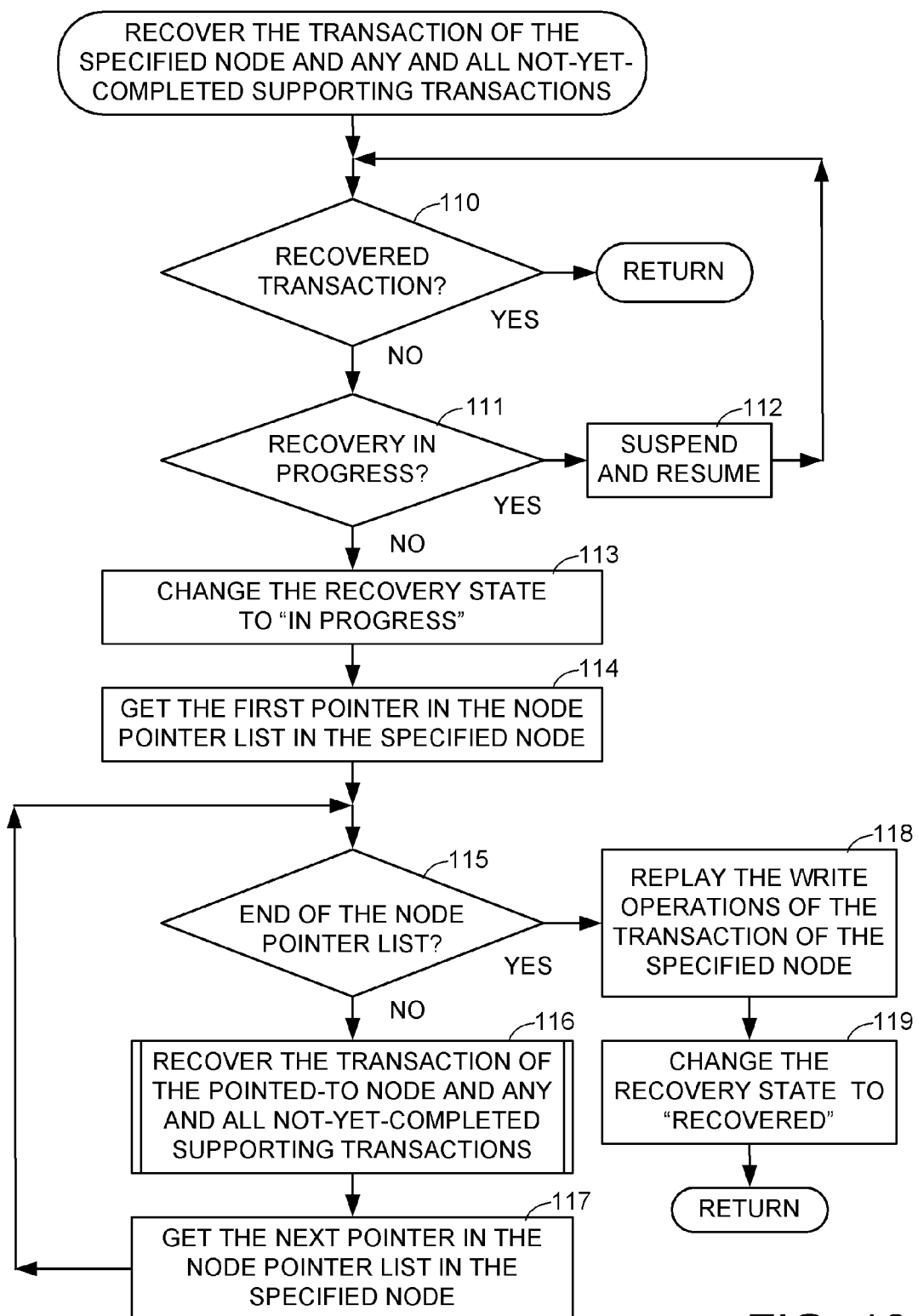
FIG. 10 is a flowchart of a recursive subroutine for recovering supporting transactions during a depth-first search of the dependency graph.

FIG. 10 shows the recursive subroutine (called in step 108 of FIG. 9) for recovering the transaction of a specified node and recovering any and all not-yet-completed supporting transactions. In a first step 110, if the specified node has a state of "recovered", then execution returns. Otherwise, execution continues to step 111. In step 111, if the specified node has a recovery state of "in progress," then execution continues to step 112 to suspend and resume execution, and then execution loops back to step 110. In this case, once the "in progress" recovery has been completed, execution will return from step 110.

In step 111, if recovery is not in progress for the node (so that the recovery state is "unrecovered"), then execution continues to step 113. In step 113, the recovery state is changed to "in progress". In step 114, the first pointer in the node pointer list to supporting nodes is obtained. Then in step 115, if the end of the node pointer list has not been reached, then execution continues to step 116. In step 116, the subroutine of FIG. 10 calls itself to recover the transaction of the pointed-to node and any and all not-yet-completed supporting transactions. Upon return from this recursive call, execution continues to step 117. In step 117, the next pointer is obtained from the list of supporting nodes. Execution loops back from step 117 to step 115.

In step 115, once the end of the node pointer list has been reached, execution branches from step 115 to step 118. In step 118, the write operations of the transaction of the specified node are replayed. Then in step 119, the recovery state of the specified node is changed to "recovered," and execution returns.

Figure 11:
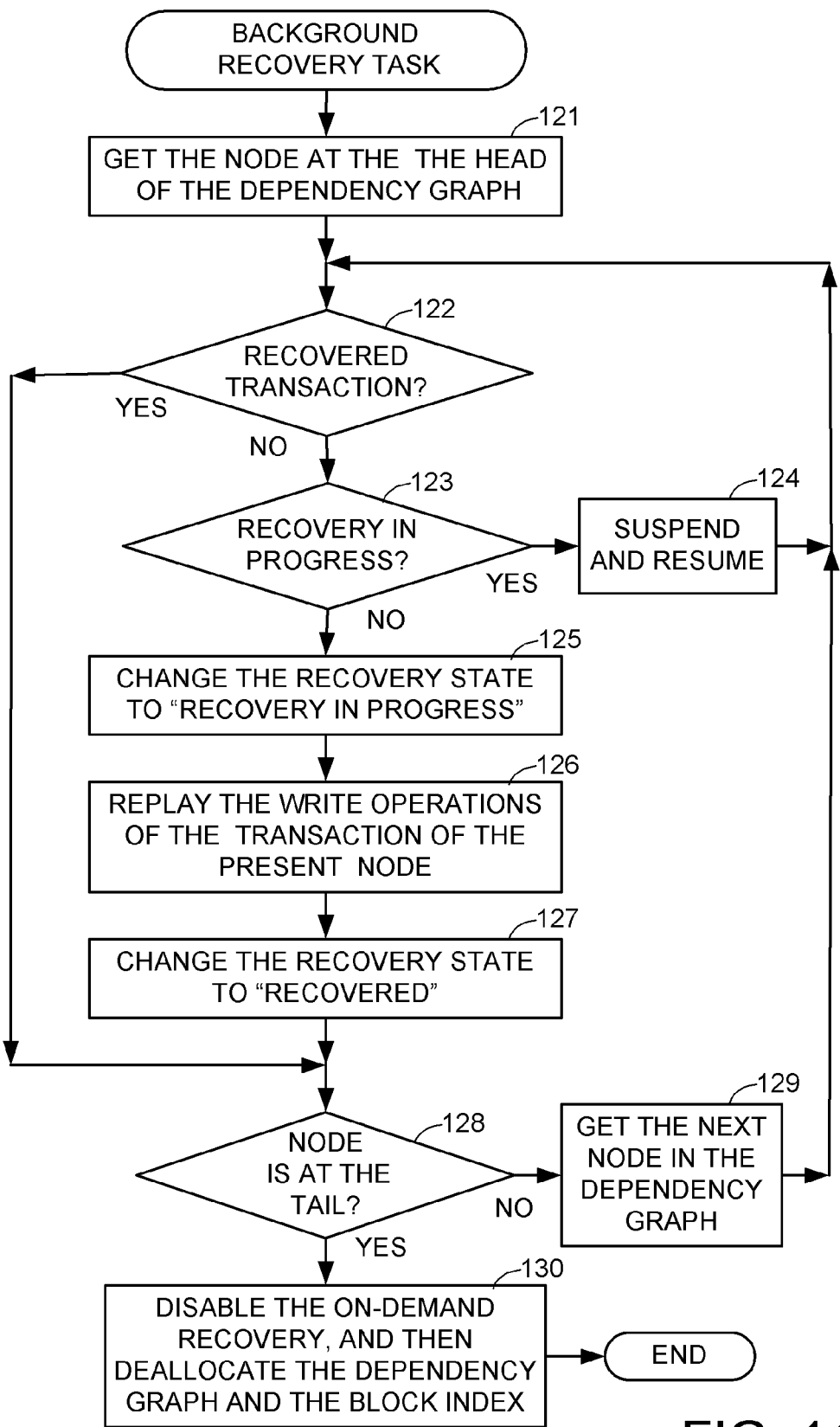
FIG. 11 is a flowchart of a background task for replay of not-yet-completed transactions in the transaction log.

FIG. 11 shows the background recovery task. In a first step 121, the node at the head of the dependency graph is accessed. Then, in step 122, if the recovery state of this present node is "recovered", then execution branches to step 128. Otherwise, if the recovery state is not "recovered, then execution continues to step 123. In step 123, if the recovery state of the node is "in progress," then execution branches to step 124 to suspend and resume the background recovery task. Execution loops back to step 122 until the recovery state changes to "recovered," and execution branches from step 122 to step 128.

In step 123, if the recovery state is not "in progress," then the recovery state is "unrecovered" and execution continues to step 125. In step 125, the recovery state of the present node is changed to "in progress." Then, in step 126, the transaction of the present node is recovered by replay of the write operations of the transaction. Then, in step 127, the recovery state of the present node is changed to "recovered". Execution continues from step 127 to step 128.

In step 128, if the present node is not at the tail of the dependency graph, then the next node in the dependency graph is accessed in the time order sequence. This next node is pointed to by the "pointer to next node" (83 in FIG. 6) in the present node. Execution loops from step 129 back to step 122, so that this "next node" becomes the present node for the next iteration through the loop of steps 122 to 129.

In step 128, once the present node is the node at the tail of the dependency graph, execution continues to step 130. In step 130, the on-demand recovery routine is disabled, and then, after any concurrent on-demand recovery operations have finished, the random access memory of the dependency graph and the block index is deallocated. After step 130, the background recovery task is terminated.

In view of the above, there has been described a way of concurrently recovering a dataset such as a file system after a server crash while the dataset is actively used for servicing client requests for access to the dataset. Therefore clients do not have to wait for replay of all of the not-yet-completed transactions. This is done in a way that does not compromise the correctness of the dataset or the stability of the storage system. In response to a reboot after a server crash, the records of not-yet-completed transactions in a transaction log are parsed to create a dependency graph of dependencies between the not-yet-completed transactions. Once this dependency graph has been created, a client may access a specified block of the dataset after on-demand recovery of the specified block. The on-demand recovery is concurrent with a background recovery task that replays the not-yet-completed transactions in time order. The on-demand recovery uses the dependency graph to replay any and all transactions that support recovery of the specified block, so that recovery of the specified block includes update of any other blocks that should be updated to be consistent with the recovered block in accordance with the not-yet-completed transactions. In a preferred implementation, the dependency graph includes a block index associating each block involved in any of the not-yet-completed transactions with a pointer to a node in the dependency graph corresponding to the most recent not-yet-completed transaction that involves the block, and each node includes the recovery state (unrecovered, in progress, or recovered) of the corresponding transaction. The recovery state is used to resolve any conflict between the on-demand recovery and the background recovery task.

What is claimed is:

1. A method of recovery of a dataset in response to reboot of a data processor of a data storage system, the data storage system having data storage storing the dataset and a log of records of transactions upon the dataset, said method comprising the data processor executing computer instructions stored on a non-transitory computer readable storage medium to perform the steps of:
   (a) parsing records in the log of transactions not-yet-completed by the time of the re-boot in order to create a dependency graph of dependencies between the not-yet-completed transactions; and then
   (b) performing a background task of replay of the not-yet-completed transactions in a time order sequence, and concurrent with the background task of replay of the not-yet-completed transactions in the time order sequence, responding to a request from a client for access to a specified block of data in the dataset by performing on-demand recovery of the specified block and then performing client access to the recovered specified block, and the on-demand recovery of the specified block accessing the dependency graph in order to replay the not-yet-completed transactions that support recovery of the specified block.

2. The method as claimed in claim 1, wherein the on-demand recovery of the specified block includes update of blocks of the dataset other than the specified block, and the blocks of the dataset other than the specified block are updated to be consistent with the recovered specified block in accordance with the not-yet-completed transactions.

3. The method as claimed in claim 1, wherein the step (b) further includes maintaining a record of a recovery state of each of the not-yet-completed transactions, the recovery state indicating whether recovery of said each of the not-yet-completed transactions is presently ongoing or has been completed, and the on-demand recovery of the specified block accesses the records of the recovery state of the not-yet-completed transactions supporting the recovery of the specified block to wait for completion of recovery of the supporting transactions having recovery presently ongoing and to skip over recovery of supporting transactions for which recovery has been completed, and the background recovery task accesses the records of the recovery state of the not-yet-completed transactions to wait for completion of recovery of the not-yet-completed transactions having recovery presently ongoing and to skip over recovery of the not-yet-completed transactions for which recovery has been completed, so that recovery is performed only once for each of the not-yet-completed transactions.

4. The method as claimed in claim 3, wherein the dependency graph includes a series of nodes having a one-to-one correspondence between each of the nodes and a corresponding one of the not-yet-completed transactions, and the dependency graph includes edges between the nodes representing dependencies between the nodes, and the method further includes maintaining the record of the recovery state of each of the not-yet-completed transactions in the corresponding node of the dependency graph.

5. The method as claimed in claim 1, wherein the dependency graph includes a series of nodes having a one-to-one correspondence between each of the nodes and a corresponding one of the not-yet-completed transactions, and the dependency graph includes edges between the nodes representing dependencies between the nodes, and the step (b) further includes replaying any and all of the not-yet-completed transactions that support recovery of the specified block by replaying the not-yet-completed transactions found during a depth-first search of the dependency graph starting with a search of a node corresponding to a most recent not-yet-completed transaction that modifies the specified block.

6. The method as claimed in claim 5, wherein the step (a) further includes creating a block index associated with the dependency graph, the block index associating each block of the dataset that is modified by any of the not-yet-completed transactions with a pointer to the node corresponding to the most recent of the not-yet-completed transactions that modifies the block, and wherein the step (b) further includes starting the search of the node corresponding to the most recent not-yet-completed transaction that modifies the specified block by accessing the block index to find the pointer to the node corresponding to the most recent not-yet-completed transaction that modifies the specified block, and using the pointer to the node corresponding to the most recent not-yet-completed transaction that modifies the specified block to start the search of the node corresponding to the most recent not-yet-completed transaction that modifies the specified block.

7. The method as claimed in claim 6, wherein the depth-first search of the dependency graph is performed by calling a recursive subroutine that searches nodes of the dependency graph that are linked to a specified node by edges of the dependency graph that point from the specified node by calling the recursive subroutine for each of the nodes pointed to by edges that point from the specified node, and then replaying the not-yet-completed transaction corresponding to the specified node.

8. The method as claimed in claim 6, wherein the step (a) further includes parsing each record in the transaction log of each not-yet-completed transaction to find any and all of the blocks of the dataset that are involved in said each not-yet-completed transaction, and for each of the blocks that is involved in said each not-yet-completed transaction, searching the block index for said each of the blocks that is involved in said each not-yet-completed transaction, and upon finding that the block index includes said each of the blocks that is involved in said each not-yet-completed transaction, adding an edge in the dependency graph from the node corresponding to said each not-yet-completed transaction to a node in the dependency graph pointed to by a pointer associated in the block index with said each of the blocks that is involved in said each not-yet-completed transaction.

9. The method as claimed in claim 8, wherein the step (a) further includes replacing the pointer, that was found to be associated in the block index with said each of the blocks that is involved in said each not-yet-completed transaction, with a pointer to the node corresponding to said each not-yet-completed transaction.

10. A data storage system comprising:
data storage storing a dataset and a log of records of transactions upon the dataset;
a data processor coupled to the data storage for providing a client with access to the dataset; and
a non-transitory computer readable storage medium coupled to the data processor and storing computer instructions that, when executed by the data processor, perform recovery of the dataset in response to reboot of the data processor by performing the steps of:
(a) parsing records in the log of transactions not-yet-completed by the time of the re-boot in order to create a dependency graph of dependencies between the not-yet-completed transactions; and then
(b) performing a background task of replay of the not-yet-completed transactions in a time order sequence, and concurrent with the background task of replay of the not-yet-completed transactions in the time order sequence, responding to a request from the client for access to a specified block of data in the dataset by performing on-demand recovery of the specified block and then performing client access to the recovered specified block, and the on-demand recovery of the specified block accessing the dependency graph in order to replay the not-yet-completed transactions that support recovery of the specified block.

11. The data storage system as claimed in claim 10, wherein the on-demand recovery of the specified block includes update of blocks of the dataset other than the specified block, and the blocks of the dataset other than the specified block are updated to be consistent with the recovered specified block in accordance with the not-yet-completed transactions.

12. The data storage system as claimed in claim 10, wherein the step (b) further includes maintaining a record of a recovery state of each of the not-yet-completed transactions, the recovery state indicating whether recovery of said each of the not-yet-completed transactions is presently ongoing or has been completed, and the on-demand recovery of the specified block accesses the records of the recovery state of the not-yet-completed transactions supporting the recovery of the specified block to wait for completion of recovery of the supporting transactions having recovery presently ongoing and to skip over recovery of supporting transactions for which recovery has been completed, and the background recovery task accesses the records of the recovery state of the not-yet-completed transactions to wait for completion of recovery of the not-yet-completed transactions having recovery presently ongoing and to skip over recovery of the not-yet-completed transactions for which recovery has been completed, so that recovery is performed only once for each of the not-yet-completed transactions.

13. The data storage system as claimed in claim 12, wherein the dependency graph includes a series of nodes having a one-to-one correspondence between each of the nodes and a corresponding one of the not-yet-completed transactions, and the dependency graph includes edges between the nodes representing dependencies between the nodes, and the step (b) includes maintaining the record of the recovery state of each of the not-yet-completed transactions in the corresponding node of the dependency graph.

14. The data storage system as claimed in claim 10, wherein the dependency graph includes a series of nodes having a one-to-one correspondence between each of the nodes and a corresponding one of the not-yet-completed transactions, and the dependency graph includes edges between the nodes representing dependencies between the nodes, and the step (b) further includes replaying any and all of the not-yet-completed transactions that support recovery of the specified block by replaying the not-yet-completed transactions found during a depth-first search of the dependency graph starting with a search of a node corresponding to a most recent not-yet-completed transaction that modifies the specified block.

15. The data storage system as claimed in claim 14, wherein the step (a) further includes creating a block index associated with the dependency graph, the block index associating each block of the dataset that is modified by any of the not-yet-completed transactions with a pointer to the node corresponding to the most recent of the not-yet-completed transactions that modifies the block, and wherein the step (b) further includes starting the search of the node corresponding to the most recent not-yet-completed transaction that modifies the specified block by accessing the block index to find the pointer to the node corresponding to the most recent not-yet-completed transaction that modifies the specified block, and using the pointer to the node corresponding to the most recent not-yet-completed transaction that modifies the specified block to start the search of the node corresponding to the most recent not-yet-completed transaction that modifies the specified block.

16. The data storage system as claimed in claim 15, wherein the depth-first search of the dependency graph is performed by calling a recursive subroutine that searches nodes of the dependency graph that are linked to a specified node by edges of the dependency graph that point from the specified node by calling the recursive subroutine for each of the nodes pointed to by edges that point from the specified node, and then replaying the not-yet-completed transaction corresponding to the specified node.

17. The data storage system as claimed in claim 15, wherein the step (a) further includes parsing each record in the transaction log of each not-yet-completed transaction to find any and all of the blocks of the dataset that are involved in said each not-yet-completed transaction, and for each of the blocks that is involved in said each not-yet-completed transaction, searching the block index for said each of the blocks that is involved in said each not-yet-completed transaction, and upon finding that the block index includes said each of the blocks that is involved in said each not-yet-completed transaction, adding an edge in the dependency graph from the node corresponding to said each not-yet-completed transaction to a node in the dependency graph pointed to by a pointer associated in the block index with said each of the blocks that is involved in said each not-yet-completed transaction.

18. The data storage system as claimed in claim 17, wherein the step (a) further includes replacing the pointer, that was found to be associated in the block index with said each of the blocks that is involved in said each not-yet-completed transaction, with a pointer to the node corresponding to said each not-yet-completed transaction.

19. A data storage system comprising:
data storage storing a dataset and a log of records of transactions upon the dataset;
a data processor coupled to the data storage for providing a client with access to the dataset; and
a non-transitory computer readable storage medium coupled to the data processor and storing computer instructions,
wherein the computer instructions include a dataset manager for managing client access to the dataset, and a dataset recovery program, and the dataset manager includes an on-demand recovery routine, and
wherein the dataset recovery program, when executed by the data processor, perform recovery of the dataset in response to reboot of the data processor by performing the steps of:
(a) parsing records in the log of transactions not-yet-completed by the time of the re-boot in order to create a dependency graph of dependencies between the not-yet-completed transactions; and then
(b) initiating a background task of replay of the not-yet-completed transactions in a time order sequence, and enabling the on-demand recovery routine, and
wherein the dataset manager, when executed by the data processor, responds to a request from the client for access to a specified block of data in the dataset by performing on-demand recovery of the specified block when the on-demand recovery routine is enabled, and then performing client access to the recovered specified block, and the on-demand recovery of the specified block accessing the dependency graph in order to replay the not-yet-completed transactions that support recovery of the specified block.

20. The data storage system as claimed in claim 19, wherein the dependency graph includes a series of nodes having a one-to-one correspondence between each of the nodes and a corresponding one of the not-yet-completed transactions, and each of the nodes has a list of pointers to nodes of supporting the not-yet-completed transactions, and each of the nodes stores an indication of recovery state of the corresponding one of the not-yet-completed transactions, the recovery state indicating whether recovery of the corresponding one of the not-yet-completed transactions is presently ongoing or has been completed, and the dependency graph has an associated block index of blocks of the dataset that are modified by the not-yet-completed transactions, and for each block modified by at least one of the not-yet-completed transactions, the block index has an associated pointer to the node corresponding to the most recent not-yet-completed transaction that modifies said each block modified by at least one of the not-yet-completed transactions; and the on-demand recovery routine, when executed by the data processor, performs a depth-first search of the dependency graph in order to replay the not-yet-completed transactions that support recovery of the specified block, and accesses the block index to find the pointer to a node of a most recent not-yet-completed transaction that modifies the specified block, and uses the pointer to the node of the most recent not-yet-completed transaction that modifies the specified block to start the depth-first search of the dependency graph at the node of the most recent not-yet-completed transaction that modifies the specified block, and accesses the records of the recovery state of the not-yet-completed transactions supporting the recovery of the specified block to wait for completion of recovery of the supporting transactions having recovery presently ongoing by the background recovery task and to skip over recovery of supporting transactions for which recovery has been completed, and the background recovery task, when executed by the data processor, accesses the records of the recovery state of the not-yet-completed transactions to wait for completion of recovery of the not-yet-completed transactions having recovery presently ongoing by the on-demand recovery routine and to skip over recovery of not-yet-completed transactions for which recovery has been completed.

* * * * *